US010820496B2

(12) United States Patent
Cook

(10) Patent No.: US 10,820,496 B2
(45) Date of Patent: Nov. 3, 2020

(54) CENTER KNIFE DRIVE FOR AN AGRICULTURAL HARVESTER

(71) Applicant: CNH Industrial America LLC, New Holland, PA (US)

(72) Inventor: Joel Timothy Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 41 days.

(21) Appl. No.: 15/718,142

(22) Filed: Sep. 28, 2017

(65) Prior Publication Data

US 2019/0090418 A1 Mar. 28, 2019

(51) Int. Cl.
*A01D 34/404* (2006.01)
*A01D 34/30* (2006.01)
(Continued)

(52) U.S. Cl.
CPC .......... *A01D 34/404* (2013.01); *A01D 34/30* (2013.01); *A01D 41/14* (2013.01); *A01D 61/002* (2013.01); *A01D 61/008* (2013.01); *A01D 61/02* (2013.01)

(58) Field of Classification Search
CPC .... A01D 34/404; A01D 34/30; A01D 61/002; A01D 61/008; A01D 61/02; A01D 41/14;
(Continued)

(56) References Cited

U.S. PATENT DOCUMENTS 738,033 A * 9/1903 Haynes ................ A01D 34/135
56/297
2,438,065 A * 3/1948 Love ...................... A01D 57/20
56/303
(Continued)

FOREIGN PATENT DOCUMENTS

DE 202011106656 U1 * 12/2011 ............. A01D 34/16
FR 1166267 A 11/1958
WO 2012166666 12/2012

OTHER PUBLICATIONS

International Search Report and Written Opinion for PCT Application No. PCT/US2018/053638 dated Jan. 23, 2019 (12 pages).

*Primary Examiner* — Arpad Fabian-Kovacs
(74) *Attorney, Agent, or Firm* — Peter Zacharias; Patrick Sheldrake

(57) ABSTRACT

A header for an agricultural harvester comprising a frame and an epicyclical drive operatively connected to the frame. The epicyclical drive includes a first rotatable wheel having a first central rotational axis and a first flange. The first flange includes a first eccentric axis rotatable about the first central rotational axis, and a first output shaft spaced from the first eccentric axis. The epicyclical drive further includes a second rotatable wheel having a second central rotational axis and a second flange. The second flange includes a second eccentric axis rotatable about the second central rotational axis, and a second output shaft spaced from the second eccentric axis. The header further includes a first cutter bar directly connected to the first output shaft and a second cutter bar directly connected to the second output shaft. Operation of the epicyclical drive results in substantially linear oscillating motion of the cutter bars.

18 Claims, 9 Drawing Sheets

(51) Int. Cl.
*A01D 41/14* (2006.01)
*A01D 61/02* (2006.01)
*A01D 61/00* (2006.01)

(58) Field of Classification Search
CPC ...... A01D 34/00; A01D 34/135; A01D 34/14; A01D 34/13
See application file for complete search history.

(56) References Cited

U.S. PATENT DOCUMENTS

| | | | |
|---|---|---|---|
| 2,664,690 A * | 1/1954 | Huddle | A01D 34/135 56/297 |
| 2,787,111 A * | 4/1957 | Templeton | A01D 34/135 56/297 |
| 2,823,506 A * | 2/1958 | Irving | A01D 34/06 56/16.2 |
| 3,074,221 A | 1/1963 | Martins | |
| 3,517,494 A * | 6/1970 | Beusink | A01D 34/30 56/293 |
| 3,763,638 A | 10/1973 | Vogelenzang | |
| 3,896,610 A * | 7/1975 | Hiniker | A01D 34/30 56/15.8 |
| 3,941,003 A * | 3/1976 | Garrison | A01D 34/30 74/44 |
| 3,973,378 A * | 8/1976 | Bartasevich | A01D 34/37 56/11.9 |
| 4,023,334 A | 5/1977 | Heath | |
| 4,067,179 A * | 1/1978 | Schneider | A01D 34/30 56/297 |
| 4,198,803 A | 4/1980 | Quick et al. | |
| 4,446,683 A | 5/1984 | Rempel et al. | |
| 4,866,921 A | 9/1989 | Nagashima et al. | |
| 4,901,512 A | 2/1990 | Castoldi | |
| 4,909,025 A * | 3/1990 | Reissig | A01D 34/305 56/257 |
| 4,910,946 A * | 3/1990 | Underwood | A01D 34/30 56/14.4 |
| 5,463,857 A | 11/1995 | Blosser | |
| 5,497,605 A | 3/1996 | Underwood et al. | |
| 6,216,429 B1 | 4/2001 | McCredie | |
| 6,314,707 B1 | 11/2001 | Ryan | |
| 6,889,492 B1 | 5/2005 | Polk et al. | |
| 7,121,074 B1 * | 10/2006 | Regier | A01D 34/305 56/296 |
| 7,401,458 B2 | 7/2008 | Priepke | |
| 7,520,118 B1 | 4/2009 | Priepke | |
| 7,730,709 B2 | 6/2010 | Priepke | |
| 7,788,891 B2 | 9/2010 | Puryk et al. | |
| 7,805,919 B2 | 10/2010 | Priepke | |
| 7,810,304 B2 | 10/2010 | Priepke | |
| 8,011,272 B1 | 9/2011 | Bich et al. | |
| 8,151,547 B2 * | 4/2012 | Bich | A01D 34/30 56/158 |
| 8,347,594 B1 * | 1/2013 | Lovett | A01D 41/14 56/296 |
| 8,973,345 B2 * | 3/2015 | Brimeyer | A01D 41/142 56/257 |
| 9,357,696 B2 * | 6/2016 | Ritter | A01D 34/02 |
| 9,357,697 B2 * | 6/2016 | Surmann | A01D 34/135 |
| 9,532,502 B2 * | 1/2017 | Cook | A01D 34/30 |
| 9,668,407 B2 * | 6/2017 | Cook | A01D 34/145 |
| 9,699,959 B2 * | 7/2017 | Wilbert | A01D 34/145 |
| 9,924,635 B1 * | 3/2018 | Lopez | A01D 34/04 |
| 10,212,884 B2 * | 2/2019 | Webermann | A01D 41/142 |
| 2007/0204586 A1 | 9/2007 | Coers | |
| 2008/0148701 A1 * | 6/2008 | Priepke | A01D 34/145 56/17.6 |
| 2009/0145097 A1 * | 6/2009 | Priepke | A01D 34/30 56/257 |
| 2009/0145264 A1 * | 6/2009 | Priepke | A01D 34/30 74/84 R |
| 2011/0078989 A1 * | 4/2011 | Bich | A01D 34/145 56/14.5 |
| 2014/0109540 A1 * | 4/2014 | Cook | A01D 34/30 56/320.1 |
| 2014/0130472 A1 * | 5/2014 | Cook | A01D 34/30 56/16.4 R |
| 2014/0215991 A1 * | 8/2014 | Brimeyer | A01D 34/30 56/14.7 |
| 2014/0230398 A1 * | 8/2014 | Cook | A01D 34/33 56/298 |
| 2014/0245713 A1 * | 9/2014 | Cook | A01D 34/30 56/290 |
| 2014/0318094 A1 * | 10/2014 | Cook | A01D 34/30 56/10.1 |
| 2014/0345239 A1 * | 11/2014 | Cook | A01D 34/145 56/10.1 |
| 2015/0000237 A1 * | 1/2015 | Ritter | A01D 34/02 56/10.1 |
| 2015/0163994 A1 | 6/2015 | Bich | |
| 2015/0305233 A1 * | 10/2015 | Surmann | A01D 34/135 56/10.1 |
| 2016/0066503 A1 * | 3/2016 | Cook | A01D 34/30 |
| 2016/0081266 A1 * | 3/2016 | Bosquet | A01D 57/10 56/13.3 |
| 2016/0135366 A1 * | 5/2016 | Cook | A01D 34/04 56/307 |
| 2017/0086368 A1 * | 3/2017 | Cook | A01D 34/30 |
| 2017/0265383 A1 * | 9/2017 | Cook | A01D 34/145 |

* cited by examiner

CENTER KNIFE DRIVE FOR AN AGRICULTURAL HARVESTER

The exemplary embodiments of present invention relate generally to a header of a plant cutting machine (e.g., a combine harvester) and, more specifically, to a header having an epicyclical drive directly connected to and driving a cutter bar.

BACKGROUND OF THE DISCLOSURE

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally inside the header.

Epicyclical cutter bar knife drives oscillate first and second sickle mechanisms of cutter bars in opposite directions in order to cut crop. However, conventional epicyclical knife drives generate moments and/or other forces that can lead to stresses in the knife drives as well as at the connections of the driver elements to the cutter bar. In addition, by virtue of their horizontal orientation with vertical output shafts, they are prone to accumulation of dirt and debris which leads to degradation of seals and premature wear of gears and other components.

BRIEF SUMMARY OF THE DISCLOSURE

In accordance with an exemplary embodiment there is provided a header for an agricultural harvester comprising a frame and an epicyclical drive operatively connected to the frame. The epicyclical drive includes a first rotatable wheel having a first central rotational axis and a first flange. The first flange includes a first eccentric axis rotatable about the first central rotational axis, and a first output shaft spaced from the first eccentric axis. Operation of the epicyclical drive results in linear oscillating or substantially linear oscillating motion in a direction transverse to the first central rotational axis. The header further includes a first cutter bar connected to or directly connected to the first output shaft extending in a direction transverse to the first central rotational axis. The oscillating motion of the first output shaft is in line with a longitudinal axis of the first cutter bar.

An aspect of the exemplary embodiment is that the epicyclical drive further includes a second rotatable wheel having a second central rotational axis and a second flange. The second flange includes a second eccentric axis rotatable about the second central rotational axis, and a second output shaft spaced from the second eccentric axis. Operation of the epicyclical drive results in linear oscillating or substantially oscillating linear motion in a direction transverse to the second central rotational axis. Further, the second central rotational axis is parallel to and spaced from the first central rotational axis. The header further includes a second cutter bar connected to or directly connected to the second output shaft extending in a direction transverse to the second central rotational axis.

Another aspect of the exemplary embodiment is that the first rotatable wheel is adjacent the first cutter bar. Further, a distal end of the first output shaft extends proud of the first flange for engaging the first cutter bar. Moreover, the first central longitudinal axis extends perpendicular or substantially transverse to a front end of the header.

Another aspect of the exemplary embodiment is that the epicyclical drive is mounted centrally along the frame. Another aspect of the exemplary embodiment is that the epicyclical drive is spaced from the center of the frame.

Another aspect of the exemplary embodiment is that the first and second output shafts are configured to oscillate in opposing directions and along a single plane. Further, a distal end of the second output shaft extends proud of the second flange for engaging the second cutter bar.

Another aspect of the exemplary embodiment is that the first central rotational axis of the first rotatable wheel is parallel to the first eccentric axis of the first flange and the first output shaft. In addition, the epicyclical drive faces an anterior direction of the header. That is, the first central rotational axis and the second central rotational axis extend perpendicular or substantially transverse to a front end of the header.

Another aspect of the exemplary embodiment is that a conveyor is attached to the frame and the epicyclical drive is positioned between the first cutter bar and the conveyor. Another aspect of the exemplary embodiment is that the conveyor is an infeed draper conveyor. Another aspect of the exemplary embodiment is that the conveyor is a lateral draper conveyor. Another aspect of the exemplary embodiment is that the epicyclical drive includes a drive shaft extending between upper and lower portions of the draper conveyor and connected to a drive mechanism. Another aspect of the exemplary embodiment is that a housing contains the epicyclical drive, wherein the housing includes a recessed contour between the first and second rotatable wheels. Another aspect of the exemplary embodiment is that a housing contains the epicyclical drive, wherein the housing includes a lower surface defining a continuous downward curvature extending from a front of the housing to a rear of the housing.

In accordance with the exemplary embodiments, there is provided an epicyclical knife drive output shaft that is directly connected to the cutter bar. When the subject disclosure is used in combination with an agricultural harvester, the disclosure overcomes one more of the disadvantages referenced above by providing a header having an epicyclical knife drive connected directly to the elongate cutter bar, thereby eliminating intervening structure between the knife drive and the cutter bar and stresses associated with such structure. In addition, the assembly has less mass and is lighter in weight which is advantageous as the combine requires less energy to lift the header, and there is less mass to float on the ground thereby reducing the likelihood of the cutter bars digging into the ground during operation. The subject disclosure provides a header having an anteriorly facing, self-cleaning epicyclical knife drive that effectively rids itself of harmful dirt and debris thereby prolonging the service life of the epicyclical knife drive.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 1:
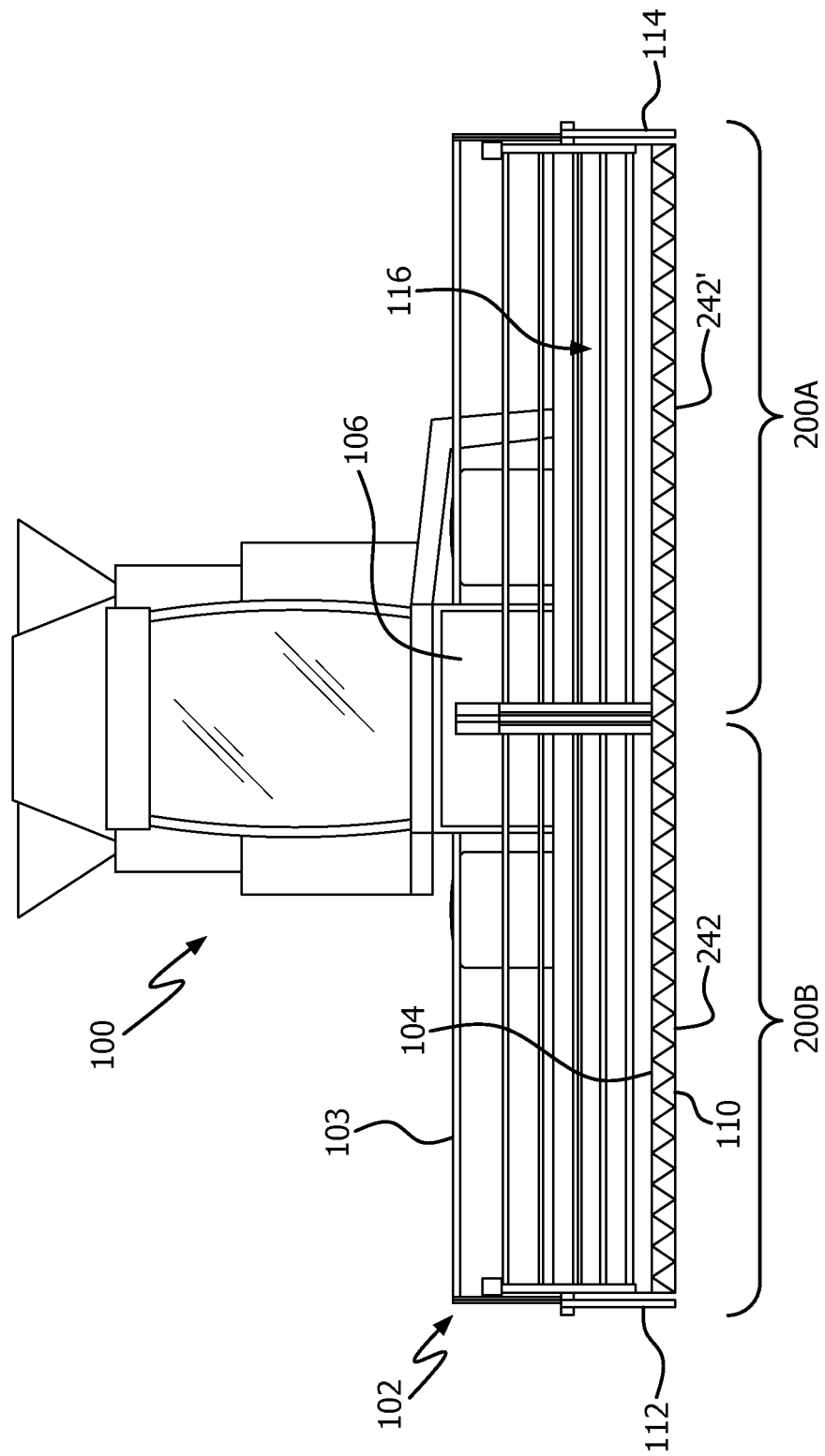
FIG. 1 is a front elevation view of an agricultural harvester including a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 includes a header 102 attached to a forward end of the harvester 100, which is configured to cut crops, including (without limitation) small grains (e.g., wheat, soybeans, grain, etc.), and to induct the cut crops into a feederhouse 106 as the harvester moves forward over a crop field.

The header 102 includes a frame 103 having a floor 104 that is supported in desired proximity to the surface of a crop field. First and second cutting assemblies 200A, 200B extend transversely along a forward edge of the floor 104 i.e., in a widthwise direction of the harvester. The first and second cutting assemblies 200A, 200B, described in greater detail hereinafter, are configured to cut crops in preparation for induction into the feederhouse 106. The header may include one or more draper conveyor belts for conveying cut crops to the feederhouse 106, which is configured to convey the cut crops into the harvester 102 for threshing and cleaning as the harvester 100 moves forward over a crop field. The header 102 further includes an elongated, rotatable reel 116 which extends above and in close proximity to the first and second cutting assemblies 200A, 200B. The rotatable reel 116 is configured to cooperate with the one or more draper conveyors in conveying cut crops to the feeder house 106 for threshing and cleaning. While the foregoing aspects of the harvester are being described with respect to the header shown, the cutting assembly of the subject application can be applied to any other header having use for such a cutting assembly.

The cutting assemblies 200A, 200B extend along a forward edge 110 of the floor 104, and are generally bounded by a first side edge 112 and an opposing second side edge 114, both adjacent to the floor 104.

According to an exemplary embodiment as shown in FIG. 1, the cutting assemblies 200A, 200B include a first cutter bar 242 and a second cutter bar 242'. The cutting assemblies 200A, 200B are driven by a knife drive assembly 220, unillustrated in FIG. 1 but described below, that drives cutter knife heads in oscillating motion whereby the knife heads move laterally to the left and right. Exemplary cutter knife heads applicable to the present exemplary embodiments are disclosed in U.S. Pat. Nos. 7,730,709 and 8,151,547, the entire disclosures of which are incorporated by reference herein in their entirety for all purposes.

Figure 2:
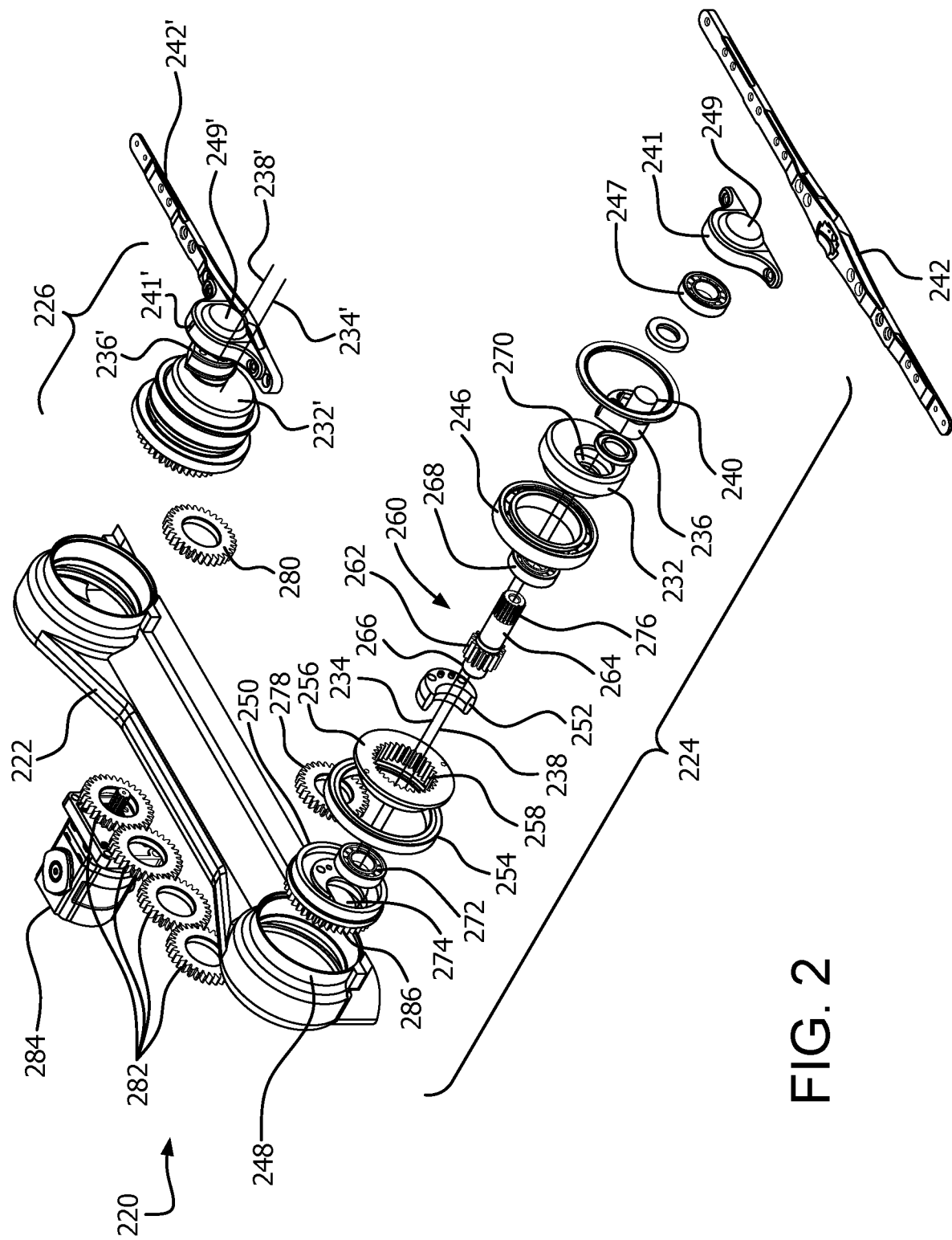
FIG. 2 is an exploded perspective view of knife drive assembly in accordance with the subject disclosure suitable for use with the header of FIG. 1.
Figure 3:
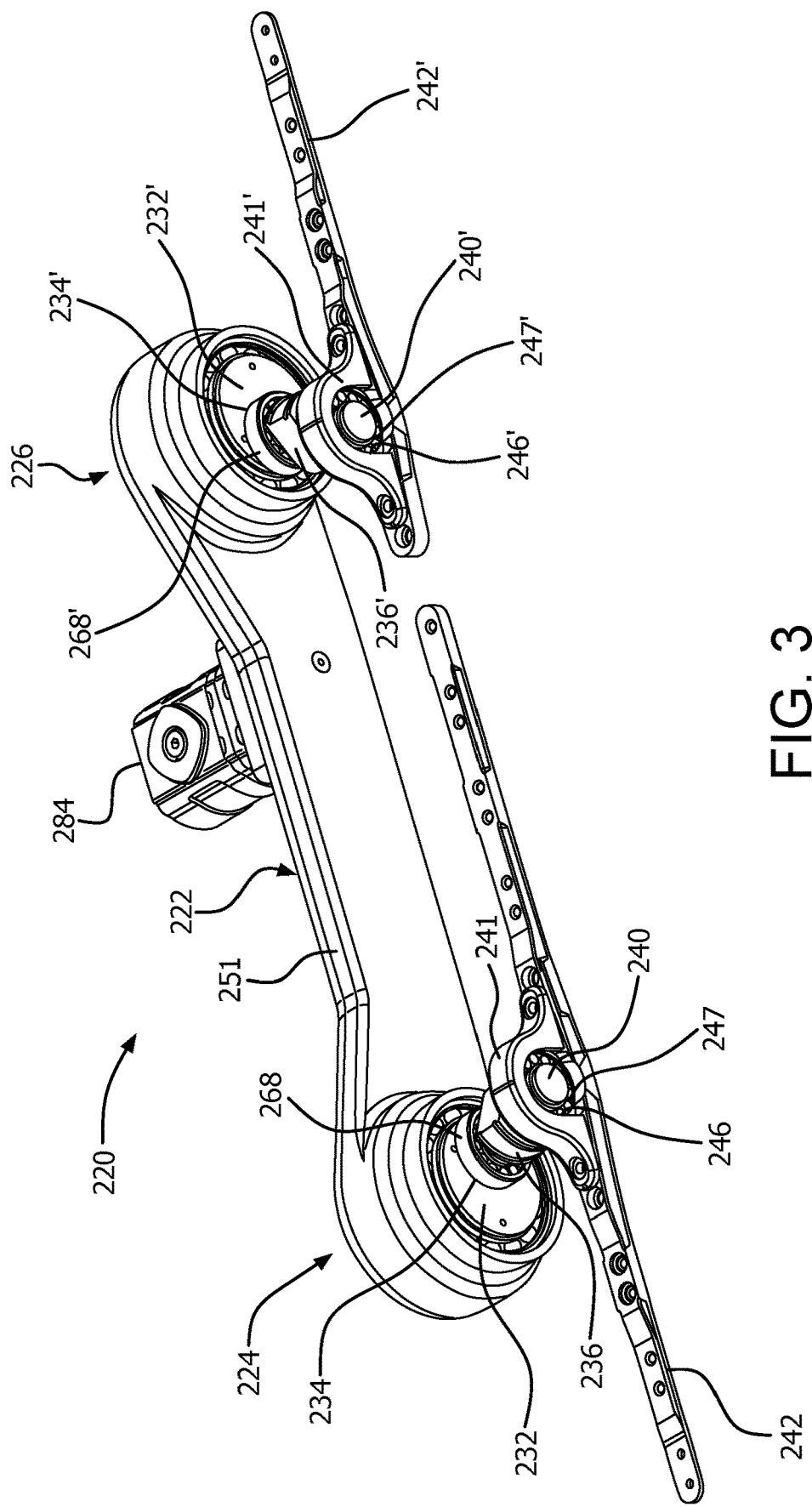
FIG. 3 is a top perspective view of cutter bars and the knife drive assembly of FIG. 2 with certain elements omitted for purposes of illustration.
Figure 4:
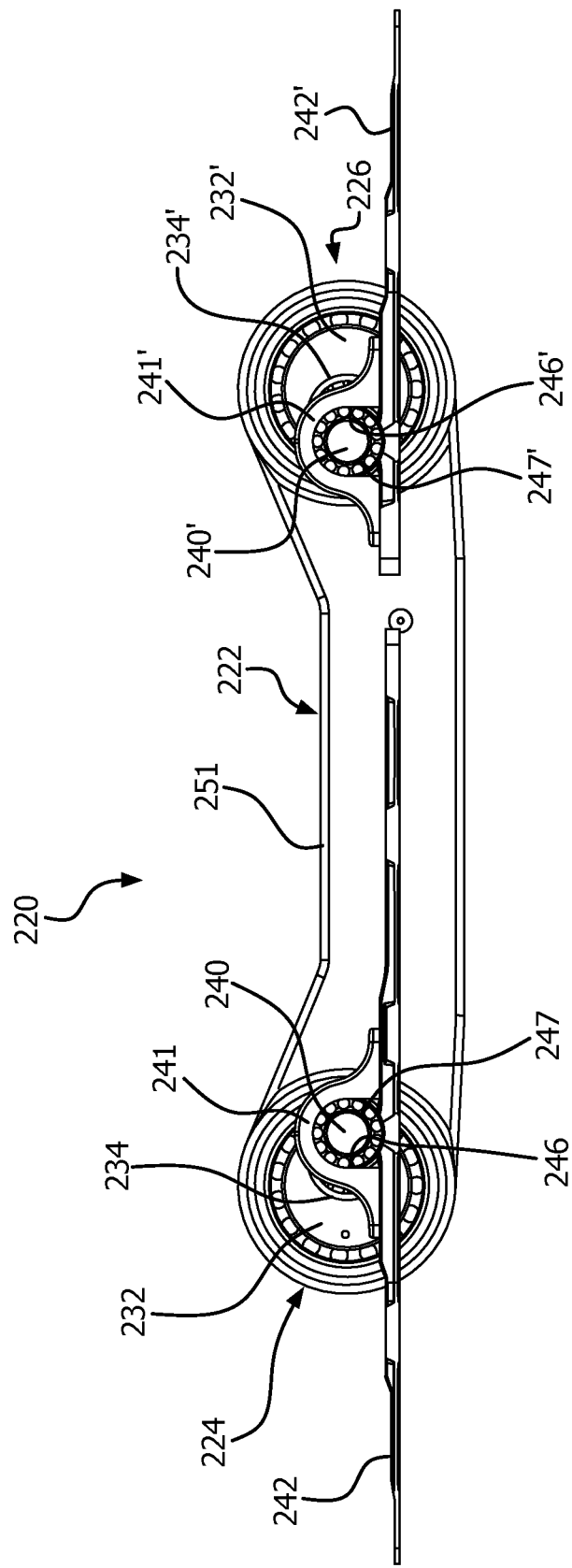
FIG. 4 is a front elevational view of cutter bars and the knife drive assembly of FIG. 2 with certain elements omitted for purposes of illustration.

Referring to FIGS. 2-4, there is shown a knife drive assembly 220 constructed in accordance with the subject disclosure. The knife drive assembly 220 includes a housing 222 that houses a pair of epicyclical drives 224, 226 that convert rotational motion to oscillating motion in a manner described in more detail below. The first and second epicyclical drives 224, 226 are mounted to the header frame 103 by virtue of the housing 222. FIG. 2 depicts both an exploded perspective view of the first epicyclical drive 224 and an assembled perspective view of the second epicyclical drive 226. As seen in connection with FIG. 2, the first epicyclical drive 224 (wherein the second epicyclical drive 226 is constructed in a mirror image-like fashion) includes a first rotatable wheel 232 having a first central rotational axis 234. The drive further includes a first flange or planetary member 236 having a first eccentric axis 238 rotatable about the first central rotational axis 234, and a first output shaft 240 spaced from the first eccentric axis. Operation of the first epicyclical drive results in linear oscillating or substantially linear oscillating motion of the output shaft in a direction transverse to the first central rotational axis 234. The oscillating motion of the first output shaft is in line with a longitudinal axis of the first cutter bar.

Likewise, the second epicyclical drive 226 includes a second rotatable wheel 232' having a second central rotational axis 234'. The second epicyclical drive further includes a second flange or planetary member 236' having a second eccentric axis 238' rotatable about the second central rotational axis, and a second output shaft spaced from the second eccentric axis. The second output shaft is shrouded from view in FIG. 2 by a cover plate of a pillow block which, in turn, is attached to a cutter bar in a manner described below. Operation of the second epicyclical drive results in linear oscillating or substantially linear oscillating motion of its output shaft in a direction transverse to the second central rotational axis. So constructed and arranged, the second central rotational axis 234' is parallel to and spaced from the first central rotational axis 234. In addition, the first central rotational axis of the first rotatable wheel is parallel to the first eccentric axis of the first flange and the first output shaft, and the second central rotational axis of the second rotatable wheel is parallel to the second eccentric axis of the second flange and the second output shaft.

As shown in FIG. 2, the first rotatable wheel 232 is mounted for rotation on an outer bearing or bushing 246 which is seated in a first forwardly facing opening 248 of the housing 222. The first rotatable wheel 232 is affixed for rotation to a first rear rotatable wheel 250 via a generally crescent-shaped connector 252 by fasteners such as screws, bolts, or the like. The first rear rotatable wheel 250 is mounted for rotation in a rear outer bearing or bushing 254 which is seated in opening 248 of the housing 222. Situated between the first rotatable wheel 232 and the first rear rotatable wheel 250 is a stationary central gear 256 having internal gear teeth 258. A shaft 260 has external gear teeth 262 adapted to matingly engage the internal gear teeth 258 of the central gear 256. Shaft 260 has portions 264, 266 that respectively rotate in a first inner bearing or bushing 268 which resides in an opening 270 in the first rotatable wheel 232 and a rear inner bearing or bushing 272 which resides in an opening 274 in the first rear rotatable wheel 250. The forward end of shaft 260 has a splined or toothed exterior 276 that is adapted to matingly engage a similarly splined or toothed interior of the first flange 236. A pair of drive gears 278 and 280 are shown forwardly of the housing for purposes of illustration, however, it will be understood that gears 278, 280 are in actuality disposed within the housing. The drive gears 278, 280 are driven along with a plurality of additional drive gears 282 disposed in housing 222 so as to drive the epicyclical drives 224, 226 in opposite directions.

Movement of the several components of the first epicyclical drive 224 is achieved as follows. A suitable driver 284 such as the illustrated fluid motor, a drive shaft, a power take-off (PTO) shaft, an electric motor, belts, chains or a combination of such drivers engages drive gears 282 and rotates drive gear 278 in a first direction. Drive gear 278, in turn, engages and drives a gear 286 affixed to the first rear rotatable wheel 250 causing rotation thereof as well as the first rotatable wheel 232 in a direction opposite the first direction about the first central rotational axis 234. As a result, shaft 260 is carried by the front and rear inner bearings or bushings 268, 272 residing in openings 270, 274 in the first rotatable wheel 232 and the first rear rotatable wheel 250 whereby the shaft 260 is caused to orbit about the first central rotational axis 234. As the shaft 260 orbits about the first central rotational axis 234, its gear teeth 262 engage gear teeth 258 of the stationary central gear 256 causing counter-rotation of the shaft 260 and the first flange 236 engaged thereby. As the first flange 236 rotates, the output shaft 240 carried thereby exhibits a linear oscillating or substantially linear oscillating motion in a direction transverse to the first central rotational axis 234.

It is understood that operation of the second epicyclical drive 226 produces an identical but opposite oscillating motion in its second flange output shaft 240' (see FIGS. 3 and 4). That is, the output shafts of the first and second epicyclical drives are configured to oscillate in opposing directions and along a single plane. Consequently, at one extreme in the motion of the output shafts of the first and second epicyclical drives 224, 226 the output shafts are at a minimum transverse distance from one another and at the opposite extreme the output shafts are at a maximum transverse distance from one another. Accordingly, when connected to cutter bar knife heads in the manner described below, the output shafts of the first and second epicyclical drives 224, 226 move the cutter bars back and forth in horizontal or substantially horizontal motion whereby the cutting knives of the cutter bars cut crop as the agricultural harvester 100 and header 102 move forwardly.

The first and second cutter bars are configured, e.g., as shown in FIGS. 3 and 4. The first cutter bar 242 extends in a direction transverse to the first central rotational axis 234, and the second cutter bar 242' extends in a direction transverse to the second central rotational axis 234' opposite the first cutter bar.

Figure 5:
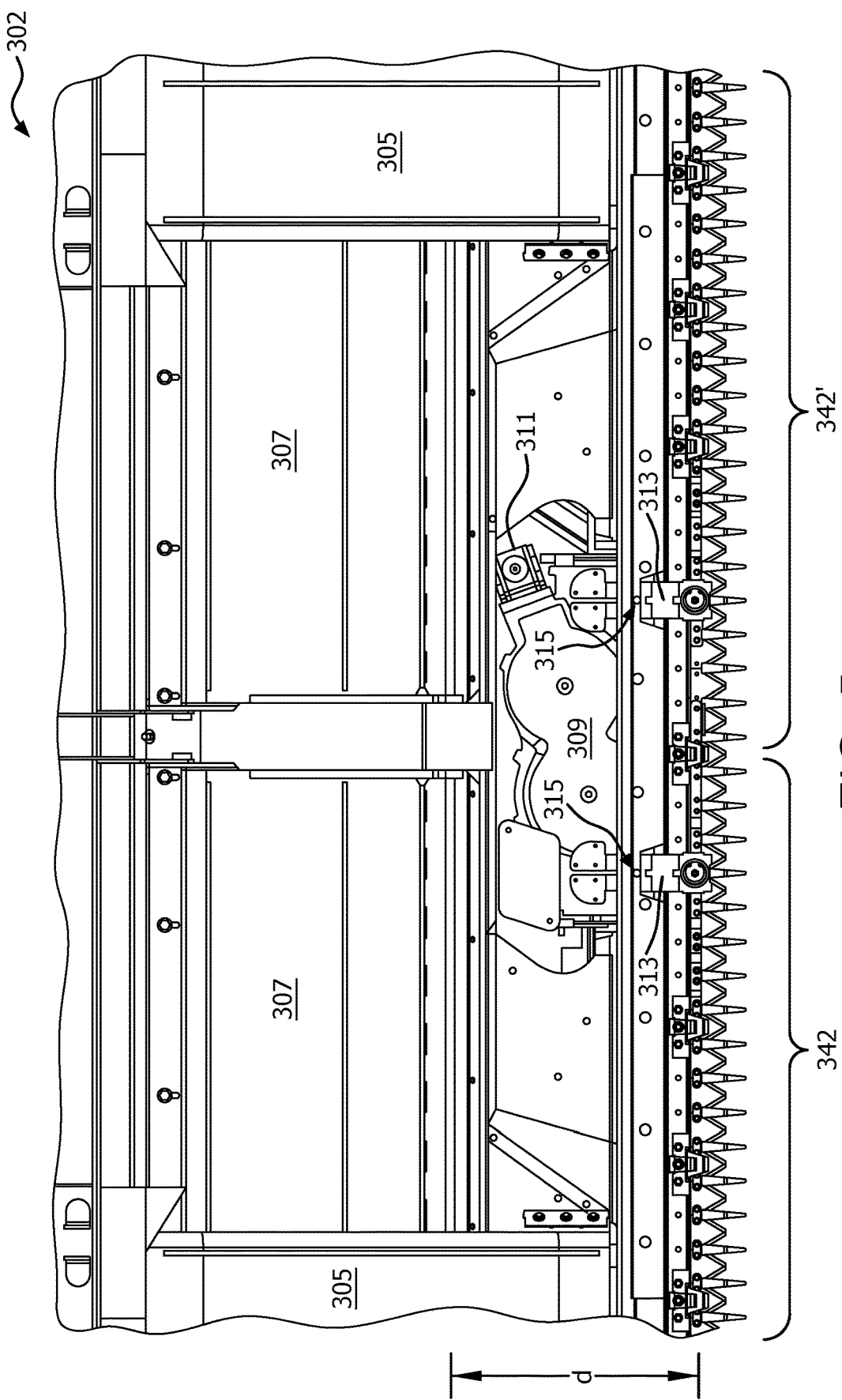
FIG. 5 is a top plan view of a fore end of an agricultural harvester header of a conventional design.

Referring to FIGS. 3 and 4, the first rotatable wheel 232 is adjacent to the first cutter bar 242 and the second rotatable wheel 232' is adjacent to the second cutter bar 242'. Further, a distal end of the first output shaft 240 extends proud of the first flange 236 whereby the first output shaft engages the first cutter bar 242. Likewise, a distal end of the second output shaft 240' extends proud of the second flange 236' whereby the second output shaft engages the second cutter bar 242'. More particularly, as shown in FIGS. 3-5, a pillow block 241 or similar structure is attached to the first cutter bar 242 by unillustrated fasteners, e.g., bolts or the like. Likewise, a pillow block 241' or similar structure is attached to the second cutter bar 242'. FIGS. 3 and 4 reveal that pillow blocks 241, 241' define openings 246, 246' for respectively receiving bearings or bushings 247, 247' within which are respectively received the first and second flange output shafts 240, 240'. In this way, the first and second cutter bars 242, 242' are directly connected to the first and second flange output shafts 240, 240'.

In addition, the first and second output shafts 240, 240' and thus the first and second central rotational axes of the first and second epicyclical drives 224, 226 extend parallel or substantially parallel to the cutter bars 242, 242' of the header 102. In other words, the central rotational axes 234, 234' of the epicyclical drives face in an anterior or substantially anterior direction whereby the first rotatable wheels 232, 232' are oriented vertically or substantially vertically, i.e., their rotational axes being horizontal or substantially horizontal. The vertical or substantially vertical orientation of the first rotatable wheels 232, 232' advantageously cause the rotating wheels to disburse dirt and debris that strikes the rotating wheels during operation of the agricultural harvester, thereby preventing such dirt and debris from collecting on the epicyclical drives 224, 226 and causing damage to the outer and inner bearings or bushings 254, 268.

Further, the first and second flange output shaft bearings or bushings 247, 247' are protected from ingress of dirt and debris by the pillow block covers 249, 249' (FIG. 2).

As shown in FIGS. 3 and 4, the upper surface of the housing 222 between the epicyclical drives 224, 226 is recessed or contoured downwardly 251 relative to the housing areas containing the epicyclical drives. Such recess creates a low profile in the center of the housing that promotes or encourages cut crop material to flow over the housing onto the draper conveyor belts situated behind the housing as described in greater detail below.

Referring to FIG. 5 there is shown in plan view a header 302 of conventional construction. As seen in FIG. 5, header 302 includes a pair of laterally-extending draper conveyors 305 which direct crop cut by cutter bars 342, 342' to a pair of centrally located, fore-and-aft extending infeed draper conveyors 307 that direct the cut crop to a feederhouse. A knife drive assembly 309 which is driven by a suitable driver 311 such as a fluid motor, a drive shaft, a PTO shaft, an electric motor, belts, chains or a combination of such drivers drives forwardly extending and pivotably mounted arms 313 to pivot in opposite directions. The distal ends of arms 313 are connected to cutter bars 342, 342' whereby the cutter bars oscillate sidewardly in opposite directions to cut crop in the manner known in the art. The conventional knife drive assembly 309 has upwardly-directed drive shafts 315 which drive generally horizontally disposed internal drive components. The horizontally disposed drive components coupled with the forwardly extending pivot arms 313 consumes considerable horizontal space behind the cutter bars 342, 342'. That is, the forwardmost edges of the infeed draper conveyors 305 are spaced a distance "d", e.g., about 20-25 inches, from the cutter bars. Consequently, crop cut by the central portions of the cutter bars tends to collect on an unillustrated plate which overlies the knife drive assembly 309 between the cutter bars and the infeed conveyors such that the cut crop does not get lifted and delivered by the infeed conveyors to the feederhouse.

Figure 6:
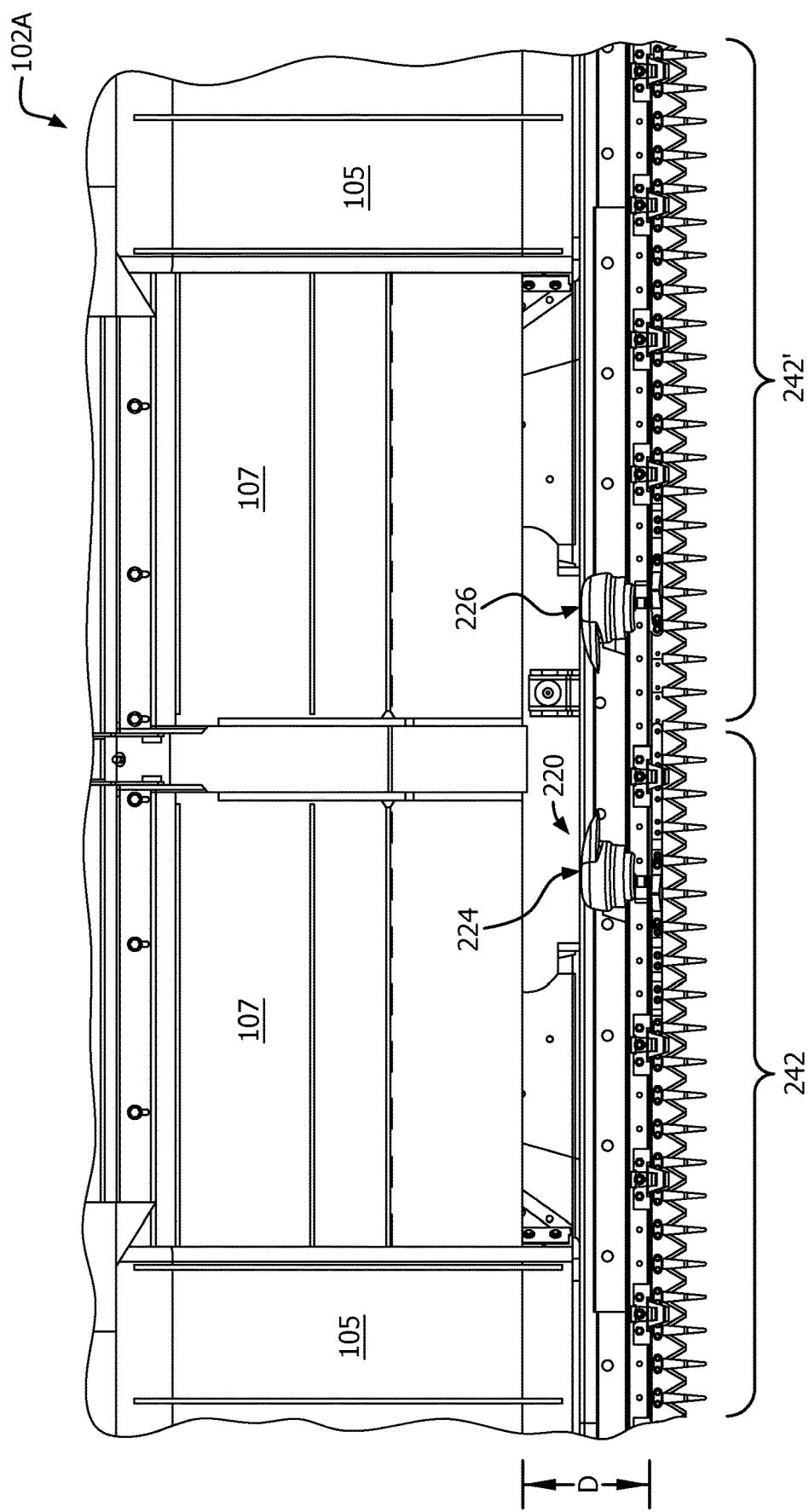
FIG. 6 is a top plan view of the fore end of an agricultural harvester header including a knife drive assembly in accordance with an exemplary embodiment of the subject disclosure.

In contrast, FIG. 6 shows a header 102A constructed in accordance with a first embodiment of the subject disclosure. The header 102A includes a pair of laterally-extending draper conveyors 105 which direct crop cut by cutter bars 342, 342' to a pair of centrally located, fore-and-aft extending infeed conveyors 107 that direct the cut crop to the aforementioned feederhouse 106 (FIG. 1). Unlike header 302, however, the epicyclical drives 224, 226 according to the subject disclosure face anteriorly rather than vertically facing and the output shafts of the epicyclical drives are directly connected to the cutter bars 242, 242'. The result is a construction that consumes considerably less distance from the cutter bars to the forwardmost edges of the infeed draper conveyors. That is, the forwardmost edges of the infeed draper conveyors 107 are moved forwardly such that they are spaced a distance "D", e.g., about 6 inches or less than about 10, 12, 14, 16, 18 or 20 inches, from the cutter bars. Consequently, minimal amounts of crop cut by the central portions of the cutter bars may collect between the cutter bars and the infeed draper conveyors and cut crop lifted and delivered by the infeed draper conveyors to the feederhouse is maximized.

Figure 7:
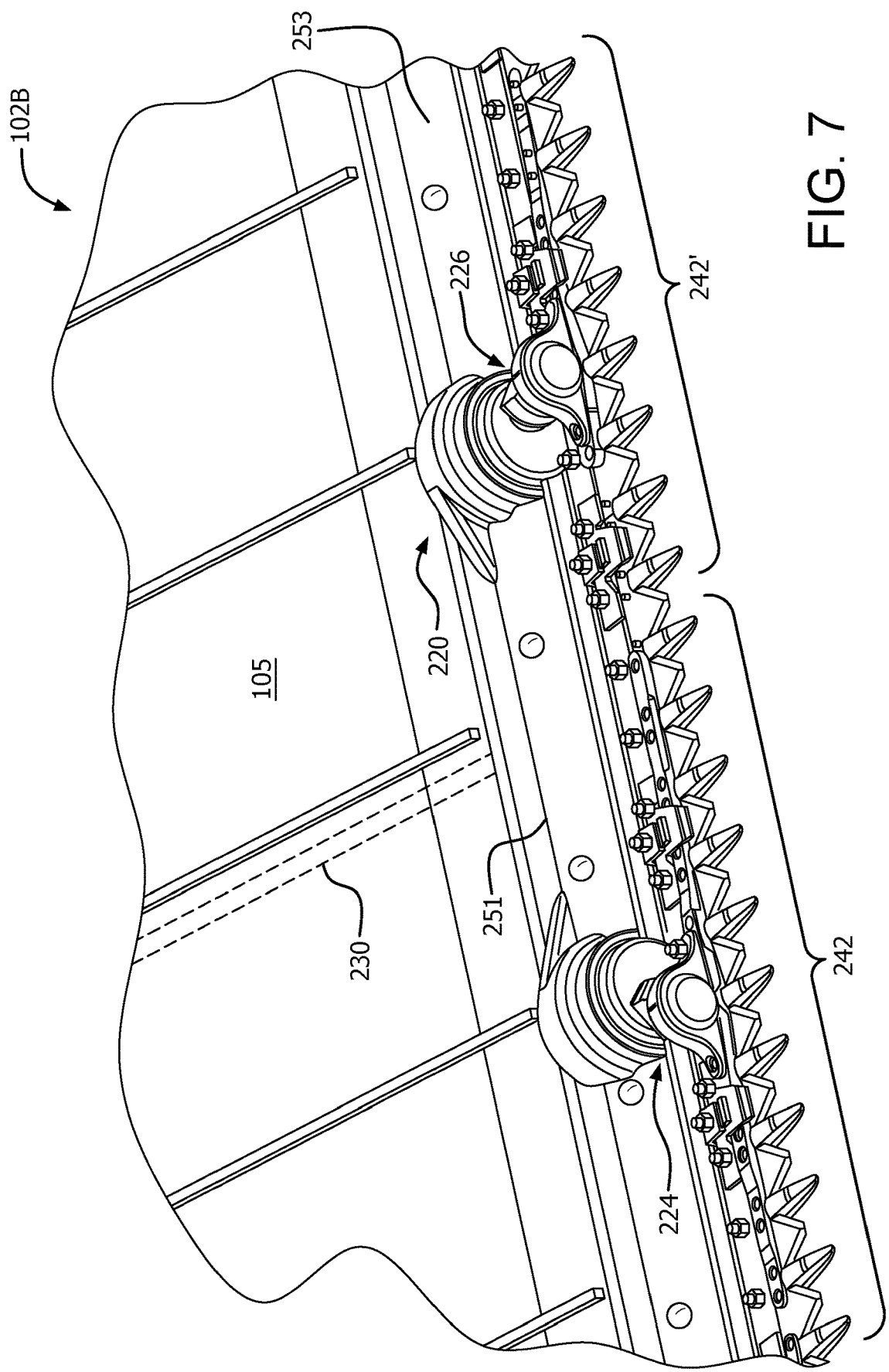
FIG. 7 is a top perspective view of a fore end of an agricultural harvester header including a knife drive assembly in accordance with another exemplary embodiment of the subject disclosure.
Figure 8:
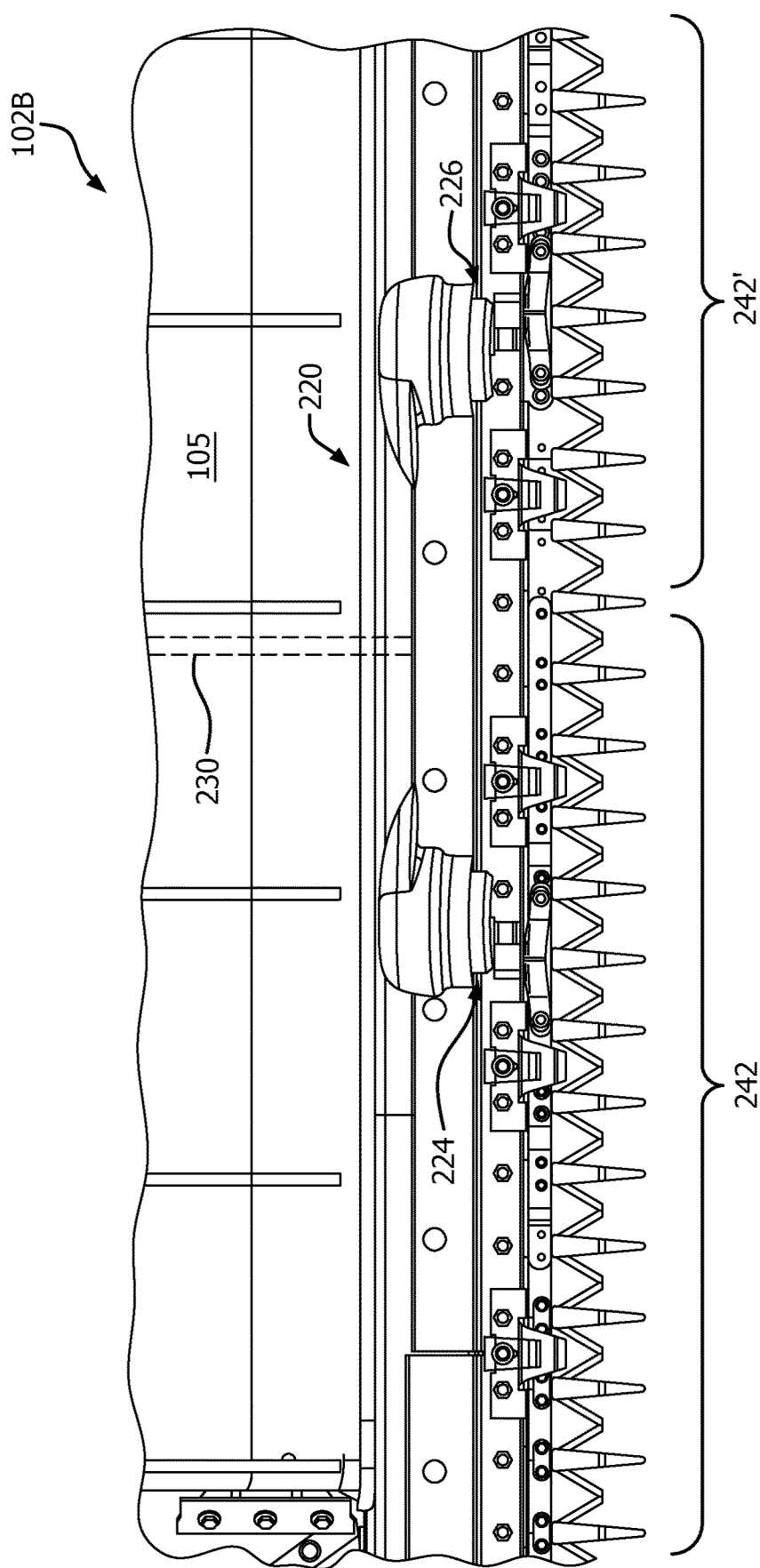
FIG. 8 is a top plan view of the agricultural harvester header of FIG. 7.

Additionally, the central recess 251 of the epicyclical drive housing 222 (FIGS. 3, 4 and 7) permits the top of the recess to be arranged such that cut crop flows readily through the space between the portions of the housing 222 between the epicyclical drives 224, 226 toward the infeed draper conveyors 107 (FIG. 6) or the lateral draper conveyor (FIGS. 7 and 8). In addition, the depth (i.e., the front to back distance) of the knife drive assembly 220 is about the same as the depth of the crop ramps 253 (FIG. 7) from the cutter bars to the later draper conveyors 105, discussed below.

Referring to FIG. 6, the knife drive assembly 220 may be mounted centrally on the header 102A. In contrast, referring to FIGS. 7 and 8, the knife drive assembly 220 may be mounted some distance from the center of the header 102B. Further, the knife drive assembly shown in FIGS. 7 and 8 is shown to be situated immediately adjacent a lateral draper conveyor 105. Again, such positioning of the knife drive assembly 220 is possible because of the comparatively short "front-to-back" or horizontal depth of the knife drive assembly.

As noted above, the epicyclical drives 224, 226 in accordance with the subject disclosure may be driven by a fluid motor, a PTO shaft, an electric motor or other common drivers such as belts or chains or a combination of such drivers. Alternatively, the epicyclical drives may include a drive shaft 230 (FIGS. 7 and 8) extending between upper and lower portions of the draper belt 105 and connected to a conventional drive mechanism (not shown) carried by the header 102B or the harvester 100.

Figure 9:
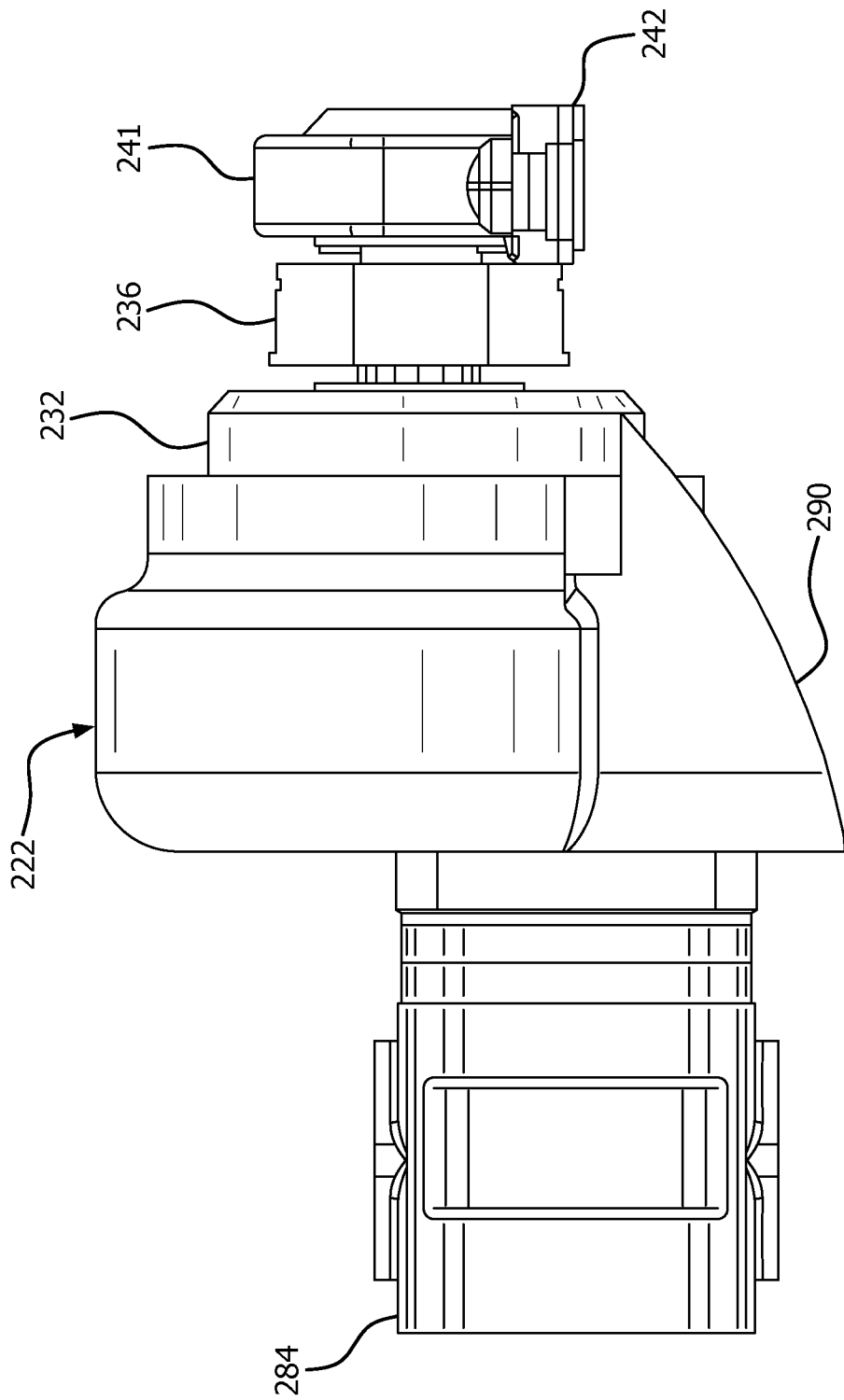
FIG. 9 is an end elevation view of the knife drive assembly of FIGS. 2-4.

As noted above, FIGS. 6-8 reveal that the housing 222 may be situated such that the recess 251 (FIGS. 3 and 4) is essentially coplanar with the upper surface of the cutter bars. In so doing, the bottom of the housing 222 projects downwardly from the header floor whereby the bottom of the housing may come into contact with the ground surface as the harvester moves over the ground. Accordingly, as shown in FIG. 9, the housing 222 is preferably contoured along a lower surface 290 thereof like a skid shoe to allow the housing to contact the ground surface with minimal resistance as the header and agricultural harvester move forwardly. That is, the skid shoe shape is defined by a continuous downward curvature extending along the lower surface of the housing from the front to the rear thereof.

According to the exemplary embodiments of the subject disclosure, the epicyclical drives 224, 226 are directly connected to and move their respective cutter bars, e.g., without any intervening structures but for bearings or bushings 247, 247' which facilitate rotation of the first and second flange output shafts 240, 240' within pillow blocks 249, 249'. In other words, the cutter bars directly engage the output shafts of the epicyclical drives. This advantageously results in a compact arrangement of parts which avoids the need for drive elements or other intervening structure to span a distance between the epicyclical drives and the cutter bars. Consequently, moments or other forces that can lead to detrimental stresses in the epicyclical drives are avoided. Stated differently, the epicyclical drives 224, 226 permit mounting of the bearings 246, 246' generally in a vertical plane with the knives, thereby rendering the knife head stronger in the up/down and front/back bending directions while minimizing fatigue caused by moments arising from arms extending from the epicyclical drives to the cutter bars.

The relatively narrow front-to-rear depth of the knife drive assembly according to the subject disclosure also enables the assembly to be placed at the center of the header or at locations spaced from the center of the header. As a result, the assembly may be placed closely adjacent either the infeed draper conveyor(s) or the lateral draper conveyors. Additionally, the assembly has less mass and is lighter in weight than conventional designs which is advantageous because the combine requires less energy to lift the header and there is less mass to float on the ground thereby reducing the likelihood of the cutter bars digging into the ground during operation. Moreover, by virtue of the anterior or substantially anterior facing arrangement of the epicyclical drives according to the subject disclosure, the vertically oriented first and second rotatable wheels with their horizontal or substantially horizontal output shafts effectively disburse dirt and debris from the drives, thereby keeping bearings and seals cleaner and prolonging the service lives of the epicyclical drives.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. A header for an agricultural harvester comprising:
a frame;
an epicyclical drive operatively connected to the frame, the epicyclical drive including:
a first rotatable wheel having a first central rotational axis, and
a first planetary flange having:
a first eccentric axis, the first planetary flange rotatable about the first eccentric axis and revolvable about the first central rotational axis, and
a first output shaft spaced from the first eccentric axis,
wherein operation of the epicyclical drive results in oscillating motion of the first output shaft in a direction transverse to the first central rotational axis; and
a first cutter bar directly connected to the first output shaft, the first cutter bar extending in a direction transverse to the first central rotational axis.

2. The header of claim 1, wherein the epicyclical drive further includes:
a second rotatable wheel having a second central rotational axis; and
a second flange having:
a second eccentric axis rotatable about the second central rotational axis, and
a second output shaft spaced from the second eccentric axis,
wherein operation of the epicyclical drive results in oscillating motion of the second output shaft in a direction transverse to the second central rotational axis; and
a second cutter bar directly connected to the second output shaft and extending in a direction transverse to the second central rotational axis.

3. The header of claim 1, wherein the first rotatable wheel is adjacent to the first cutter bar.

4. The header of claim 1, wherein a distal end of the first output shaft extends proud of the first flange.

5. The header of claim 2, wherein the epicyclical drive is mounted centrally along the frame.

6. The header of claim 2, wherein the epicyclical drive is spaced from the center of the frame.

7. The header of claim 2, wherein the second central rotational axis is parallel to and spaced from the first central rotational axis.

8. The header of claim 2, wherein the first and second output shafts are configured to oscillate in opposing directions.

9. The header of claim 2, wherein the first and second output shafts oscillate along a single plane.

10. The header of claim 2, wherein the first central rotational axis and the second central rotational axis extend transverse to a front end of the header.

11. The header of claim 2, wherein the first central rotational axis of the first rotatable wheel is parallel to the first eccentric axis of the first flange and the first output shaft, and wherein the second central rotational axis of the second rotatable wheel is parallel to the second eccentric axis of the second flange and the second output shaft.

12. The header of claim 1, wherein the first central rotational axis is horizontally oriented and the epicyclical drive faces in an anterior direction of the header.

13. The header of claim 1, further comprising a conveyor attached to the frame and wherein the epicyclical drive is positioned between the first cutter bar and the conveyor.

14. The header of claim 13, wherein the epicyclical drive includes a drive shaft extending between upper and lower portions of the conveyor and connected to a drive mechanism.

15. The header of claim 1, further comprising a housing containing the epicyclical drive, wherein the housing includes a recessed contour.

16. The header of claim 1, further comprising a housing containing the epicyclical drive, wherein the housing includes a lower surface defining a continuous downward curvature extending from a front of the housing to a rear of the housing.

17. The header of claim 1, wherein the oscillating motion of the first output shaft is in line with a longitudinal axis of the first cutter bar.

18. The header of claim 1, further comprising a driver having a drive shaft offset from the first rotational axis.

* * * * *